United States Patent Office 2,975,138
Patented Mar. 14, 1961

2,975,138

HEAT TRANSFER FLUID

Bernard Thomas Dudley Sully, Ewell, England, assignor to A. Boake Roberts and Company Limited, London, England, a British company No Drawing. Filed Nov. 26, 1954, Ser. No. 471,521

3 Claims. (Cl. 252—78)

This invention relates to the employment of organic material as a medium for the transfer of heat from one point to another.

It has been found that the boric acid esters of phenol, cresol or xylenol or mixtures thereof have outstanding properties as heat exchange liquids.

There are many advantages for using an organic material as a heat transfer material. Thus, it is possible to work at temperatures above 100° C. without the disadvantages caused by the high pressures that must be employed when steam is used. The prime requirements of an organic heat transfer medium are that it must be very stable to heat and must have a high boiling point.

Various proposals have been made hitherto for using organic materials as heat exchange media, in particular diphenyl, and especially selected mineral oils have been employed for this purpose, but diphenyl is solid at room temperatures and the mineral oils are not stable under severe conditions and have a tendency to produce insoluble degradation products which deposit on the heating surfaces and ultimately form coke. Other synthetic materials have been proposed which are more stable but are expensive and cannot be manufactured by simple means from readily available raw materials. An advantage of the phenolic esters of boric acid is that they have a boiling point greater than 380° C. at atmospheric pressure and thus it is possible to attain a high temperature without working under pressure as is necessary, for example, with the commonly used eutectic mixture of diphenyl and diphenyl oxide.

Boric acid esters of homologues of phenol other than cresol or xylenol will also give satisfactory heat exchange liquids, but they are more expensive and in some cases insufficiently stable.

According to the present invention, therefore, a heat-exchange system comprises as the heat exchange fluid a boric acid ester of phenol selected from the group consisting of phenol, cresol and xylenol and mixtures thereof.

The boric acid esters of phenol and the specified homologues have considerable advantages over materials hitherto proposed for this purpose. In the first place they are very easily prepared. Tritolyl borate which is the preferred heat exchange material according to the invention may be simply prepared by direct reaction between cresol and boric acid, but it must be used in a system that is free from water, otherwise it is decomposed back to cresol and boric acid. This, however, is not a serious disadvantage because the cresol and boric acid re-combine when the mixture is heated. Moreover, the heat transfer may be achieved by tritolyl borate in either the liquid or vapour form and it is possible to control the temperature by operating under vacuum.

In employing the organic borates as heat exchange media, the organic medium may be heated by any known means—as, for example, by circulation in the liquid state through pipes in a furnace and the heated liquid may be pumped away and used for heating at a distance from the furnace. Moreover, the organic material according to the invention may also be used as a cooling fluid.

Experiments have shown that for use at the highest temperatures it is preferable to use the esters of phenol or the meta-para-cresol isomers. Thus, in an experiment in a glass apparatus it was found that both trimeta-tolyl and tripara-tolyl borates could be heated for over 2000 hours under refluxing conditions at a temperature around 370° C. without serious decomposition. Under similar conditions the ortho-isomer, however, was less stable and became dark after about 1000 hours. Distillation of the trimeta-tolyl borate after heating in this way for 2000 hours showed that it contained about 1½% of free cresol and that 56% of pure tri-meta-tolyl borate could be recovered by distillation up to a temperature of 220° C. and a pressure of 1 mm. Hg. The residue though viscous when cold was free from suspended carbon and was suitable for further use as a heat transfer medium. An examination of the tripara-tolyl borate after similar treatment showed that it contained about 1% of free cresol and that 33% of pure triparatolyl borate could be recovered by distillation up to a temperature of 215° C. and a pressure of 1 mm. Hg. The residue had a higher viscosity than the starting material when cold but it was transparent and free from suspended matter and was still suitable for use as a heat transfer medium. In no case was there any deposition of carbon on the heating surface.

Triphenyl borate is also very stable, but it has the disadvantage of a higher melting point (84° C.) than the other isomers. However, by suitable mixing of the esters of the various phenol isomers, it is possible to prepare several mixtures which are liquid at room temperature.

Experiments have shown that the mixed tritolyl borate isomers are not corrosive to mild steel or stainless steel. Rods of the following pairs of metals were brazed or welded together (1) mild steel and brass, (2) mild steel and copper, (3) copper and stainless steel, (4) stainless steel and mild steel. After heating in tritolyl borate to a temperature of 340° C. for 1008 hours, the samples were removed and examined. It was found that apart from a darkening of the surface there was no sign of etching or corrosion.

When used at temperatures of 250° to 300°C. in a mild steel plant constructed in such a manner that the hot circulating fluid is out of contact with air, and that the contents of the expansion tank, which is vented to atmosphere through a moisture trap, are cool, the useful life is many months. After it has become too viscous for use, a considerable proportion may be recovered by distillation in vacuo.

A liquid mixture of tritolyl borate isomers (3,500 ml.) prepared from commercial meta-para-cresol was heated to 340° C. in a mild steel apparatus so arranged that it was kept completely filled. After 1080 hours the tritolyl borate mixture was examined and found to have twice the viscosity of the original material when measured at room temperature. The proportion of the combined cresol which had been converted to other substances during this period was 13%, but they remained dissolved in the fluid so that its value as a heat exchange medium was unimpaired. The used fluid contained no particles in suspension and there was no deposition on the heating surfaces.

An industrial plant using 90 gallons of the above tritolyl borate prepared from commercial meta-para-cresol has been operated between temperatures of 250 to 280° C. for over nine months without observable change in the rate of heat transfer, and a second plant using 40 gallons of the same triaryl borate has operated for twelve months with the addition of 5 gallons to make up for a mechanical loss which occurred after the first 7 months. At this time also the heating surfaces were examined and found to be free from any signs of coking. After 12 months a sample of the triaryl borate was removed from the system and found to be less viscous than the initial material owing to the presence of a small proportion of cresol. There was still no sign of carbon formation.

I claim:

1. In a process for transmitting heat by means of a heat transfer fluid, the step which comprises employing as the heat transfer fluid, a boric acid ester of a phenol selected from the group consisting of triphenyl, tritolyl and trixylenyl borates.

2. The process of claim 1 wherein the heat transfer fluid is tritolyl borate.

3. In a process for transmitting heat by means of a heat transfer fluid, the step which comprises employing as the heat transfer fluid, a liquid selected from the group consisting of triphenyl, tritolyl and trixylenyl borates and mixtures of said esters which are liquid at room temperature.

References Cited in the file of this patent

UNITED STATES PATENTS

| | | |
|---|---|---|
| 2,260,336 | Prescott et al. | Oct. 28, 1941 |
| 2,568,472 | Trautman | Sept. 18, 1951 |
| 2,650,031 | Hitch et al. | Aug. 25, 1953 |